US010767791B2

(12) United States Patent
May

(10) Patent No.: US 10,767,791 B2
(45) Date of Patent: Sep. 8, 2020

(54) CLAMP WITH BRACKET APERTURES

(71) Applicant: Christopher Charles May, Zephyr (CA)

(72) Inventor: Christopher Charles May, Zephyr (CA)

(*) Notice: Subject to any disclaimer, the term of this patent is extended or adjusted under 35 U.S.C. 154(b) by 0 days.

(21) Appl. No.: 16/306,304

(22) PCT Filed: Jun. 2, 2017

(86) PCT No.: PCT/IB2017/053277
§ 371 (c)(1),
(2) Date: Nov. 30, 2018

(87) PCT Pub. No.: WO2017/208203
PCT Pub. Date: Dec. 7, 2017

(65) Prior Publication Data
US 2019/0170273 A1   Jun. 6, 2019

(30) Foreign Application Priority Data

Jun. 3, 2016  (CA) ...................... 2932083

(51) Int. Cl.
*F16B 33/04*   (2006.01)
*F16L 3/137*   (2006.01)
(Continued)

(52) U.S. Cl.
CPC ................ *F16L 3/137* (2013.01); *F16B 2/02* (2013.01); *F16B 2/08* (2013.01); *F16L 33/04* (2013.01)

(58) Field of Classification Search
CPC . F16L 3/137; F16L 33/04; F16L 33/08; F16B 2/08; F16B 2/06; F16B 2/02; A61B 17/823; A61B 17/82
(Continued)

(56) References Cited

U.S. PATENT DOCUMENTS 907,542 A * 12/1908 Vogel ................. H01R 4/643
439/799
1,552,932 A * 9/1925 Kessler ................. H01R 4/60
439/207
(Continued)

FOREIGN PATENT DOCUMENTS

BE   520580 A   12/1953
GB   175641     5/1923
(Continued)

OTHER PUBLICATIONS

WIPO/IB, International Preliminary Report on Patentability, dated Dec. 13, 2018, re PCT International Patent Application No. PCT/IB2017/053277.
(Continued)

*Primary Examiner* — Nkeisha Smith
(74) *Attorney, Agent, or Firm* — Perry + Currier, Inc.

(57) ABSTRACT

The present disclosure relates to a clamp having a band for substantially surrounding an object between a first end with a first opening and a second end with a second opening, a bracket, and a fastener. The bracket includes a base with a bottom surface for placement on a surface of the object and a wall. The base also includes a first base aperture for receiving the first end and a second base aperture spaced from the first base aperture for receiving the second end. The wall has a wall opening and extends substantially perpendicular to a top surface of the base. The fastener extends through the wall opening, the first opening and the second opening to secure the first end to the second end and moves the first end towards the second end to tighten the band and the base of the bracket to the surface of the object.

17 Claims, 7 Drawing Sheets

(51) Int. Cl.
*F16B 2/08* (2006.01)
*F16B 2/02* (2006.01)
*F16L 33/04* (2006.01)

(58) Field of Classification Search
USPC ....... 248/58–63, 65, 70–73, 74.3, 74.2, 74.4
See application file for complete search history.

(56) References Cited

U.S. PATENT DOCUMENTS

| | | | | |
|---|---|---|---|---|
| 1,748,536 A * | 2/1930 | Borden | .................... | H01R 4/38 |
| | | | | 439/799 |
| 1,809,009 A * | 6/1931 | Andre | .................... | H01R 4/60 |
| | | | | 439/795 |
| 2,278,071 A * | 3/1942 | Gass | .................... | F16L 33/04 |
| | | | | 24/281 |
| 2,542,172 A * | 2/1951 | Wold | .................... | F16L 3/14 |
| | | | | 428/573 |
| 2,659,954 A | 11/1953 | Woolsey | | |
| 3,305,199 A * | 2/1967 | Bayes | .................... | F16L 3/127 |
| | | | | 248/74.1 |
| 3,575,367 A * | 4/1971 | Welsh | .................... | F16L 3/11 |
| | | | | 248/59 |
| 3,579,754 A * | 5/1971 | Oetiker | .................... | F16L 33/04 |
| | | | | 24/279 |
| D289,141 S | 4/1987 | Tunno et al. | | |
| 4,858,860 A * | 8/1989 | Richards | .................... | F16L 3/11 |
| | | | | 248/62 |
| 5,102,075 A * | 4/1992 | Dyer | .................... | B65D 63/16 |
| | | | | 24/16 PB |
| 5,131,856 A * | 7/1992 | Auclair | .................... | H01R 4/643 |
| | | | | 24/280 |
| 5,221,064 A * | 6/1993 | Hodges | .................... | F16L 3/133 |
| | | | | 248/333 |
| 5,903,957 A * | 5/1999 | Le Manchec | .................... | A47H 13/01 |
| | | | | 16/87.2 |
| 6,254,051 B1 | 7/2001 | Hubbard et al. | | |
| 6,398,596 B1 * | 6/2002 | Malin | .................... | H01R 4/42 |
| | | | | 174/78 |
| 6,691,379 B2 | 2/2004 | Schaub | | |
| 6,880,210 B2 * | 4/2005 | Kudlacz | .................... | F16L 3/14 |
| | | | | 24/570 |
| 7,076,842 B2 | 7/2006 | Steadman | | |
| 7,122,739 B2 * | 10/2006 | Franks, Jr. | .................... | H01R 4/643 |
| | | | | 174/51 |
| D574,227 S | 8/2008 | Andersson | | |
| 7,441,311 B2 | 10/2008 | Lovgren et al. | | |
| 7,770,937 B2 | 8/2010 | Ignaczak et al. | | |
| D632,555 S | 2/2011 | Sarkissian | | |
| 8,136,771 B2 * | 3/2012 | Cazalet | .................... | F16L 3/10 |
| | | | | 248/58 |
| 9,605,798 B2 * | 3/2017 | Brown | .................... | F16M 13/02 |
| 9,780,547 B2 * | 10/2017 | Akahane | .................... | F16B 2/08 |
| 10,107,419 B2 * | 10/2018 | Anderson | .................... | F16L 3/24 |
| 2002/0000026 A1 * | 1/2002 | Noda | .................... | F16L 3/1025 |
| | | | | 24/458 |
| 2004/0130147 A1 * | 7/2004 | Cousineau | .................... | F16L 3/14 |
| | | | | 285/253 |
| 2016/0258455 A1 * | 9/2016 | Chang | .................... | F16B 2/08 |

FOREIGN PATENT DOCUMENTS

| | | |
|---|---|---|
| GB | 770540 | 3/1957 |
| WO | WO-2008097914 A1 | 8/2008 |

OTHER PUBLICATIONS

International Search Report and Written Opinion dated Sep. 20, 2017, by ISA, re PCT International Patent Application No. PCT/IB2017/053277.

* cited by examiner

CLAMP WITH BRACKET APERTURES

CROSS-REFERENCE TO RELATED APPLICATIONS

This application claims priority to Canadian Patent Application No. 2,932,083, filed Jun. 3, 2016, the entirety of which is incorporated herein by reference.

FIELD OF THE INVENTION

The present disclosure relates to a clamp for surrounding an object, such as for example a hose, a pipe, a duct, and the like, and for securing the object to another object.

BACKGROUND

Clamps are typically used for example to securing objects together. An example of a known clamps which may be used for securing two nested hoses together include worm gear hose clamps, spring clamps, wire clamps and ear clamps. Known worm gear hose clamps include a band for surrounding an outer surface of one hose being clamped to another hose nested within the hose and a worm gear for altering a diameter to the band. To secure the two nested hoses together, the worm gear of the worm gear hose clamp is rotated to reduce the diameter of the band and apply a force to the outer surface of the hose until the two nested hoses are secured together. When a diameter of an outer surface of a hose being secured to another hose exceeds the diameter of the band of the worm gear hose clamp, a different worm gear hose clamp may be required to secure the hose to the other hose. Known worm gear hose clamps are therefore limited in that multiple different worm gear clamps may be needed to secure objects of different sizes.

SUMMARY

According to one aspect of an embodiment, a clamp includes a band configured to substantially surround an object between a first band end and a second band end, the first band end comprising a first band opening and the second band end comprising a second band opening. The clamp also includes a bracket that includes a base comprising a top surface, an opposing bottom surface for placement on a surface of the object, a first base aperture for receiving the first band end and a second base aperture spaced from the first base aperture for receiving the second band end; and, a wall extending substantially perpendicular to the top surface of the base, the wall having a wall opening. The clamp also includes a fastener configured to extend through the wall opening, the first band opening and the second band opening to secure the first band end to the second band end and move the first band end towards the second band end to tighten the band and the base of the bracket to the surface of the object.

The fastener may include a fastener head configured to abut the wall and apply a force against the wall to move the second band end towards the first band end to tighten the band and the base of the bracket to the surface of the object.

The fastener may be further configured to move the second band end away from the first band end to loosen the band and the base of the bracket from the surface of the object.

The fastener may be rotatable within the wall opening, the first band opening and the second band opening to move the second band end towards the first band end to tighten the band and the base of the bracket to the surface of the object.

The fastener may be further rotatable within the wall opening, the first band opening and the second band opening to move the second band end away from the first band end to l the band and the base of the bracket to the surface of the object The base may include a third base aperture disposed between the first base aperture and the second base aperture for receiving the second band end.

The fastener may further include a head and a threaded end, and a nut configured for securely attaching to the threaded end of the fastener.

The fastener further may include a threaded shank.

The fastener may further include a washer configured to receive the nut and facilitate securing of the first band end to the second band end and move the second band end towards the first band end to tighten the band and the base of the bracket to the surface of the object.

The base of the bracket may be substantially flat.

The base of the bracket may be made from a deformable material.

The base of the bracket may be made from a metal.

The base of the bracket may have an arcuate shape.

The band may include a plurality of band openings between the first band end and the second band end, the plurality of band openings including the first band opening and the second band opening.

The bracket and the wall may be integrally formed.

According to another aspect of an embodiment, a bracket for use with a band and a fastener to form a clamp is provided, in which the band configured to substantially surround an object between a first band end comprising a first band opening and a second band end comprising a second band opening. The bracket includes: a base comprising a top surface, an opposing bottom surface for placement on a surface of the object, a first base aperture for receiving the first band end of the band and a second base aperture spaced from the first base aperture for receiving the second band end of the band; and, a wall extending substantially perpendicular to the top surface of the base, the wall having a wall opening for receiving the fastener configured to extend through the first band opening and the second band opening to secure the first band end to the second band end and move the first band end towards the second band end to tighten the band and the bracket to the surface of the object.

BRIEF DESCRIPTION OF THE DRAWINGS

Embodiments of the present invention will be described, by way of example, with reference to the drawings and to the following description, in which.

Figure 5:
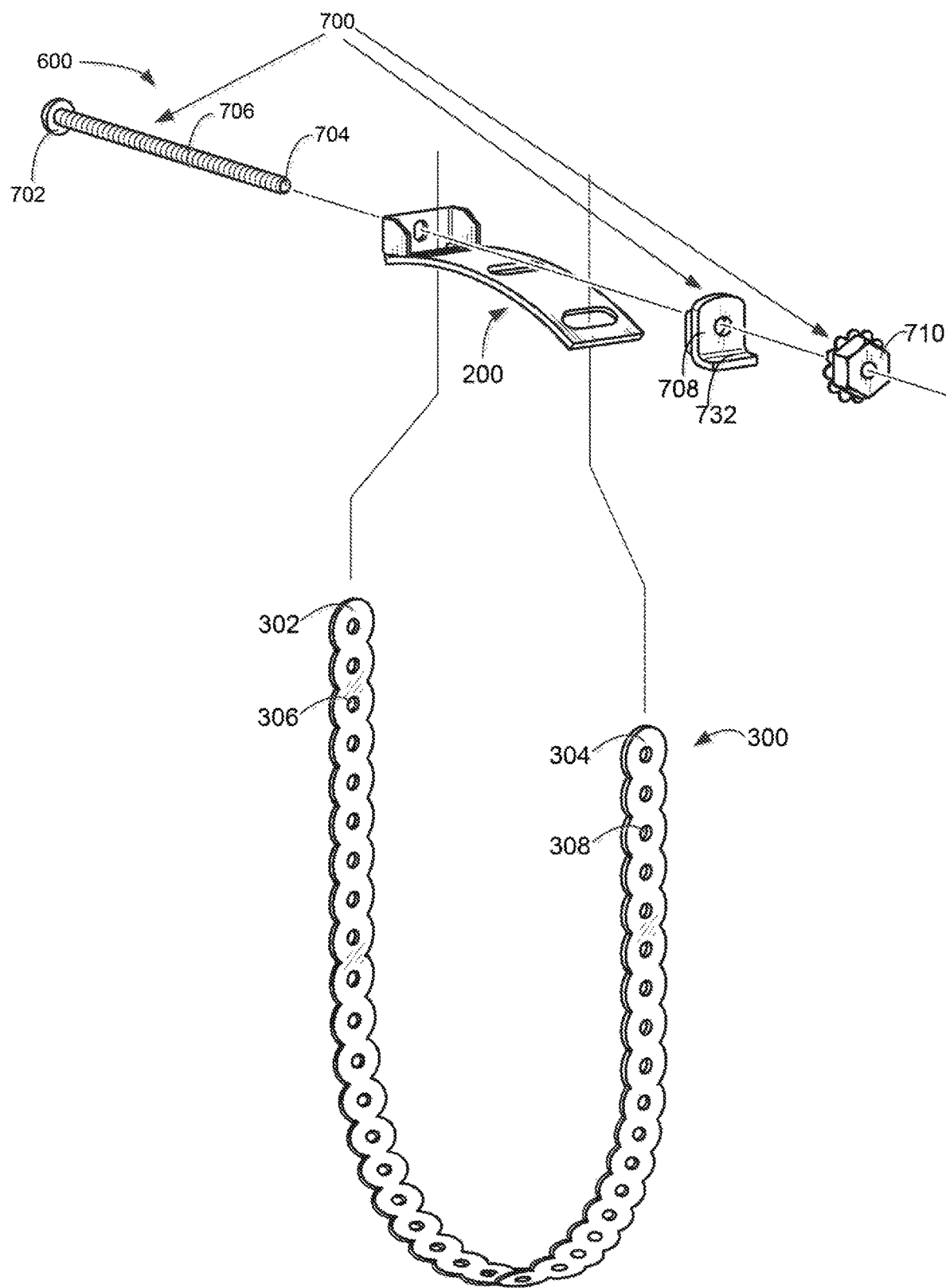
FIG. 5 is an exploded isometric view of a clamp in accordance with another embodiment.
Figure 7:
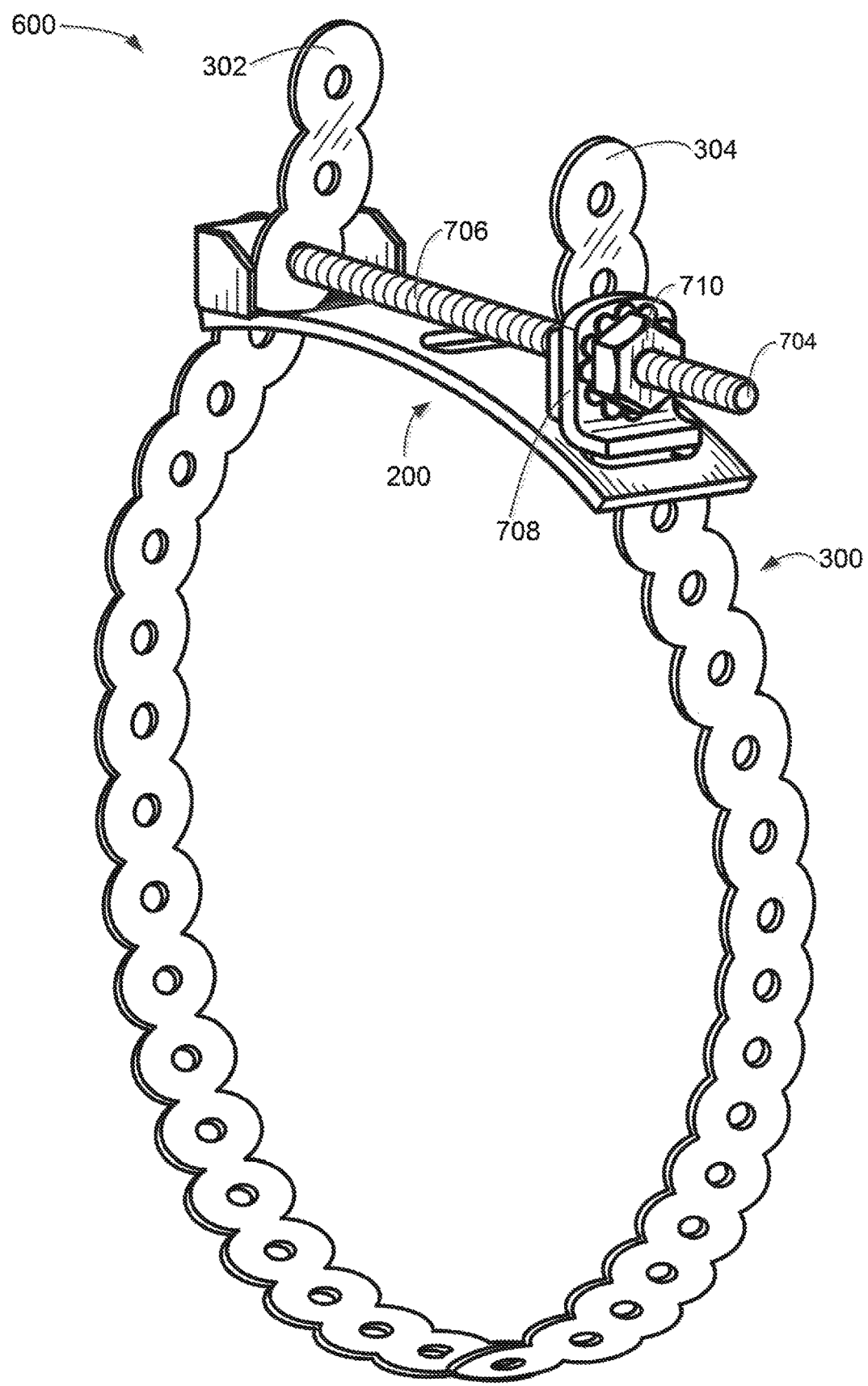

6B is a cross-sectional view of the washer of the clamp of FIG. 5 in accordance with an embodiment;

FIG. 7 is an isometric view of the clamp of FIG. 5 assembled.

DETAILED DESCRIPTION OF THE PREFERRED EMBODIMENTS

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to clamps for surrounding an object, such as for example a hose, a pipe, a duct, and the like, and for securing the object to another together.

Figure 1:
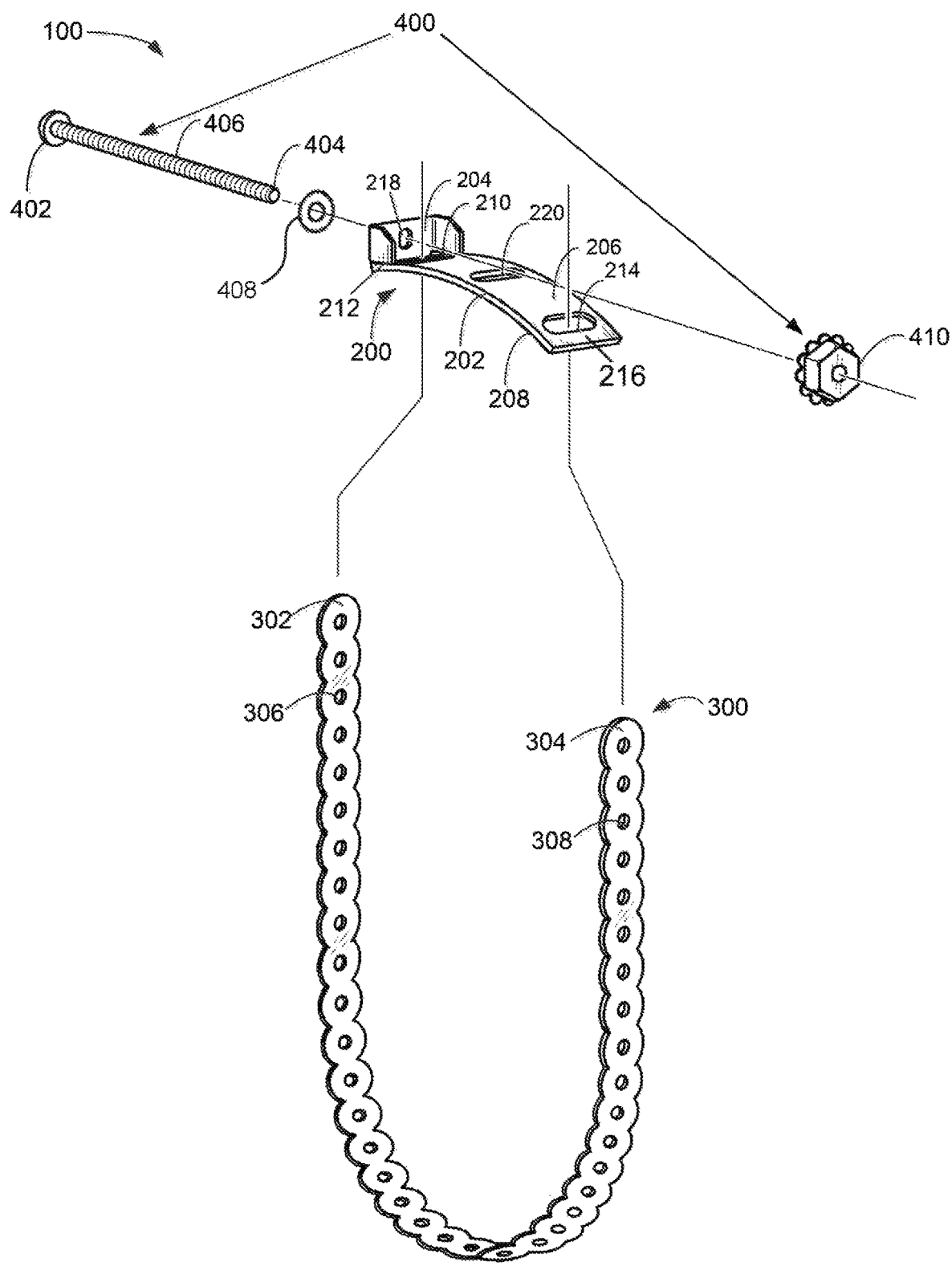
FIG. 1 is an exploded isometric view of a clamp in accordance with an embodiment.

Referring to FIG. 1, an exploded isometric view of an embodiment of a clamp 100 for surrounding an object and securing the object to another object is shown. Clamp 100 may be used for surrounding an object and securing the object to another object nested within the object. Alternatively, the clamp 100 may be used for surrounding adjacent ends of two objects having substantially the same perimeter to secure the two objects together.

The clamp 100 includes a bracket 200, a band 300 and a fastener 400. The bracket 200 includes a base 202 and a wall 204. The base 202 has a top surface 206 and an opposing bottom surface 208 for placement on a surface of an object (not shown). The base 202 includes a first base aperture 210 proximate a first base end 212 of the base 202 and a second base aperture 214 proximate a second base end 216 that opposes the first base end 212. The wall 204 of the bracket 200 is disposed at the first base end 212 and extends substantially perpendicular to and away from the top surface 206 of the base 202. The wall 204 may be integrally formed with the base 202 or may be attached to the base 202 by for example, welding. The wall 204 also includes a wall opening 218 shaped and dimensioned to receive the fastener 400. The base 202 also includes a third base aperture 220 between the first base aperture 210 and the second base aperture 214.

The band 300 is configured to substantially surround an object (not shown) between a first band end 302 and a second band end 304. The band 300 includes a plurality of band openings between the first band end 302 and the second band end 304. The first band end 302 includes a first band opening 306 of the plurality of band openings and the second band end 304 includes a second band opening 308 of the plurality of band openings. Each of the plurality of band openings, including the first band opening 306 and the second band opening 308, are shaped and dimensioned to receive the fastener 400. The band 300 may include any suitable number of band openings.

In the embodiment illustrated in FIG. 1, the clamp 100 is utilized for surrounding an object that has a curved outer surface, such as, for example, a hose, to secure the object to another object nested within the object. The bracket 200 is made of metal, such as, for example, steel, stainless steel, aluminum and the like. The base 202 has an arcuate shape so that the bottom surface 208 of the base 202 corresponds to the curved outer surface of the object (not shown) to facilitate placement of the bottom surface 208 of the base 202 on the curved outer surface of the object (not shown). In other words, the base 202 is shaped to match the curved outer surface of the object (not shown). The first base aperture 210 is shaped and dimensioned to receive the first band end 302. The second base apertures 214 is shaped and dimensioned to receive the second band end 304. The fastener 400 comprises a screw that includes a head 402, a threaded end 404, and a threaded shank 406 extending between the head 402 and the threaded end 404. The fastener 400 also includes a washer 408 and a threaded nut 410. The threaded end 404 and the shank 406 of the fastener 400 are shaped and dimensioned to fit and extend through the first band opening 306, the second band opening 308, and the wall opening 418. In the embodiment illustrated in FIG. 1, the shank 406 is threaded from the head 402 to the threaded end 404. In an alternative embodiment, the fastener 400 may include a bolt that includes a head, a threaded end, a threaded shank, and a shoulder adjacent the head of the fastener 400. In this alternative embodiment, the shoulder is not threaded and extends between the head and the treaded end of the fastener 400.

Figure 2:
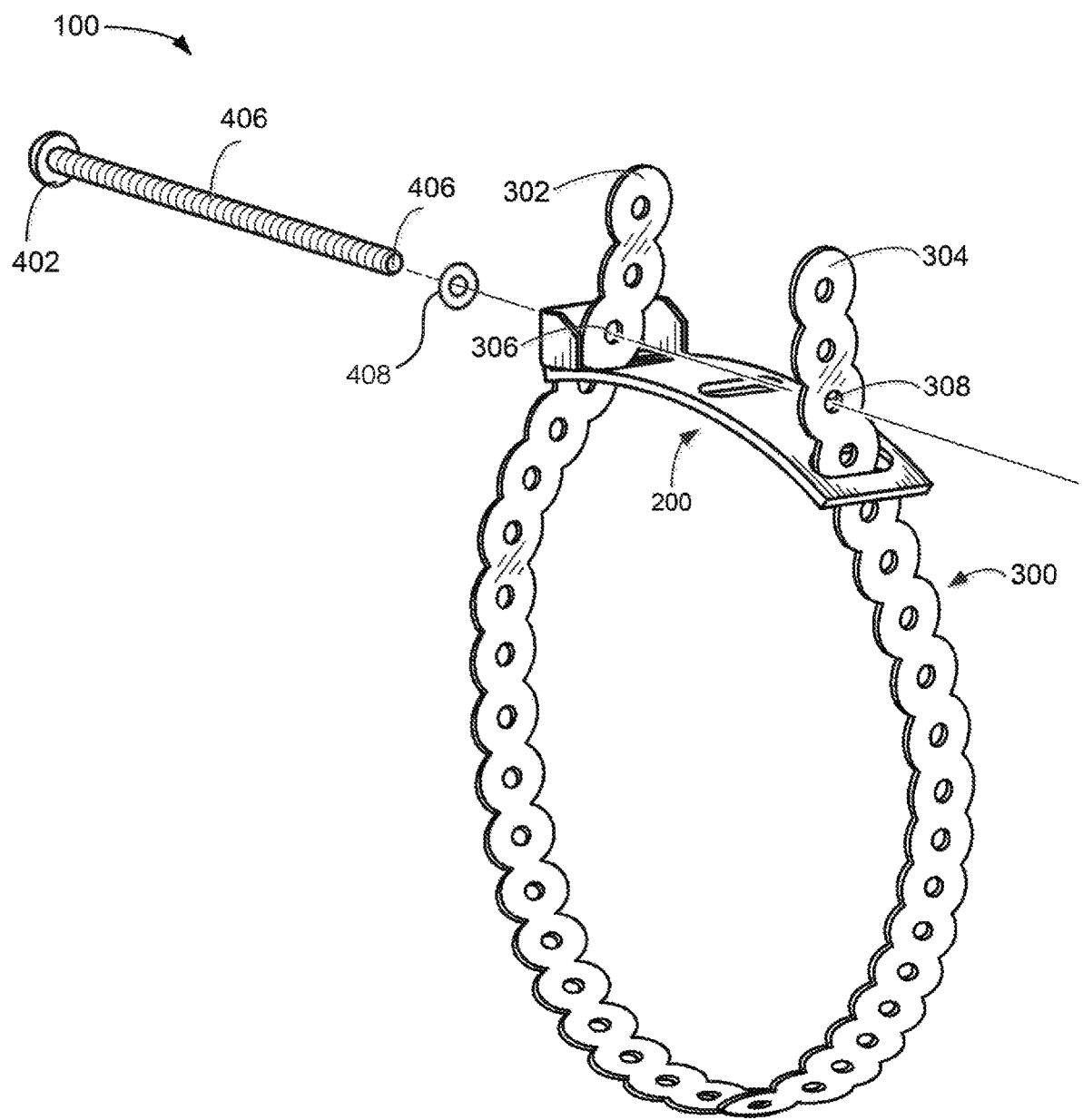
FIG. 2 is an isometric view of the clamp of FIG. 1 partially assembled.

The assembly of the clamp 100 of FIG. 1 will now be described with reference to FIG. 2 and FIG. 3, which respectively illustrate the clamp 100 partially assembled and fully assembled. As illustrated in FIG. 2, the band 300 surrounds an object (not shown) with the first band end 302 extending through the first base aperture 210 of the base 202 of the bracket 200 such that the first band opening 306 is positioned above the top surface 206 of the base 202 of the bracket 200 and the second band end 304 extending through the second base aperture 214 of the base 202 of the bracket 200 such that the second band opening 308 is positioned above the top surface 206 of the base 202 of the bracket 200.

Figure 3:
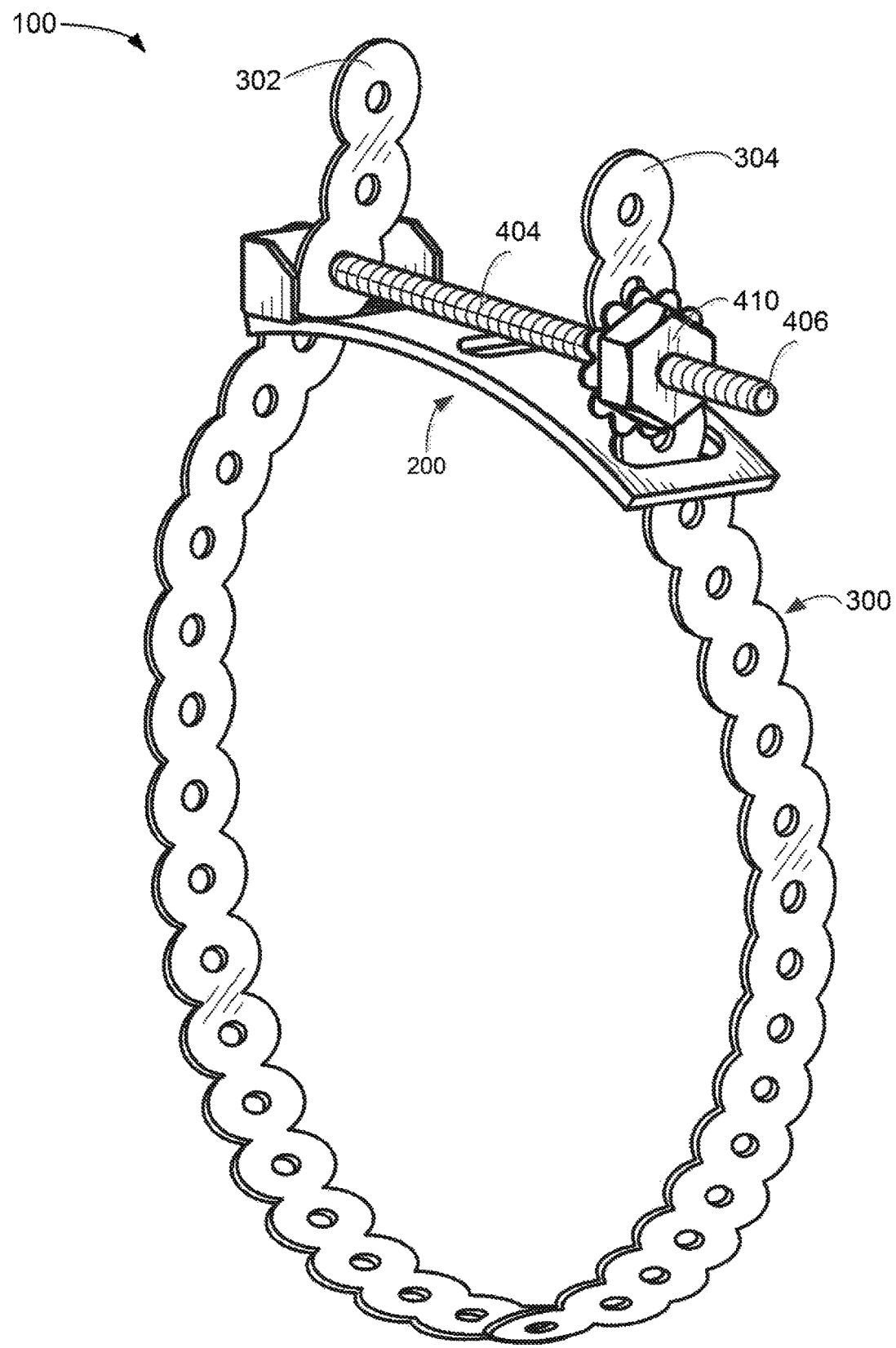
FIG. 3 is an isometric view of the clamp of FIG. 1 assembled.

As illustrated in FIG. 3, the fastener 400 is utilized to secure the second band end 304 to the first band end 302 and move the second band end 304 towards the first band end 302 to tighten the band 300 and the base 202 of the bracket 200 to the curved surface of the object (not shown). To secure the second band end 304 to the first band end 302, the threaded end 404 of the fastener 400 is first inserted through the washer 408 of the fastener 400. The threaded end 404 of the fastener 400 is then inserted through the wall opening 218, the first band opening 306, and the second band opening 308 until the head 402 of the fastener 400 abuts the wall 204 of the bracket 200 so that the shank 406 extends between the first band end 302 and the second band end 304. The threaded nut 410 is attached to the threaded end 404 of the fastener 400 to secure the second band end 304 to the first band end 302. The threaded nut 410 may apply a force against the second band end 304 to move the second band end 304 towards the first band end 302 to tighten the band 300 and the base 202 of the bracket 200 to the curved surface of the object (not shown) to secure the object to the other object nested within the object. The head 402, the threaded end 404, and the shank 406 of the fastener 400 may be also be rotatable within the wall opening 218, the first band opening 306 and the second band opening 308. For example, when the threaded nut 410 is held and the head 402, the threaded end 404, and the shank 406 of the fastener 400 are rotated (e.g. torqued) in one direction (e.g. clockwise), the head 402 of the fastener 400 pushes against the wall 204 and applies a force against the wall 204 and moves the second band end 304 of the band 300 towards the first band end 302 of the band 300 and tightens the band 300 and the base 202 against the curved surface of the object (not shown) to secure the clamp 100 to the object (not shown). When the threaded nut 410 is held, using for example, pliers or a wrench, and the fastener 400 is rotated (e.g. torqued) in an opposite direction (e.g. counter clockwise), the second band end 304 moves away from the first band end 302 and loosens the band 300 and the base 202 from the curved surface of the object (not shown).

Alternatively, the head 402 of the fastener 400 may be held using for example, pliers, a screwdriver, or a wrench, and the threaded nut 410 may be rotated (e.g. torqued) in one direction (e.g. clockwise) to move the second band end 304 of the band 300 towards the first band end 302 of the band 300 and tighten the band 300 and the base 202 against the curved surface of the object (not shown) to secure the clamp 100 to the object (not shown) and may be rotated (e.g. torqued) in an opposite direction (e.g. counter clockwise) to move the second band end 304 away from the first band end 302 and loosen the band 300 and the base 202 from the curved surface of the object (not shown).

Although the bracket 200 in the embodiment depicted in FIG. 1 is made of metal, in an alternative embodiment, the bracket 200 may be made of any suitable material, such as for example, plastic such as polyvinyl chloride (PVC). Further, although the first base aperture 210 is proximate the first base end 212 of the base 202 and the second base aperture 214 proximate the second base end 216 in the embodiment depicted in FIG. 1, in alternative embodiments, the first base aperture 210 and the second base aperture 214 may be at other suitable locations in the base 202 of the bracket 200. Moreover, although the fastener 400 depicted in the embodiment in FIG. 1 comprises a head 402, a threaded end 404, and a shank 406, a washer 408 and a threaded nut 410, other suitable fasteners, such as, for example, a cable tie, a clip, a threaded rod, and the like, may be utilized to secure the second band end 304 to the first band end 302 and move the second band end 304 towards the first band end 302 to tighten the band 300 and the base 202 of the bracket 200 to the curved surface of the object (not shown).

Referring again to FIG. 1, the base 202 of the bracket 200 includes the third base aperture 220 disposed between the first base aperture 210 and the second base aperture 214 to adjust a length of the band 300 surrounding the object (not shown) in order to facilitate adjusting a width of the assembled clamp 100. The third base aperture 220 is shaped and dimensioned to receive the second band end 304. To adjust the width of the assembled clamp 100, the second band end 304 may be inserted through the third base aperture 220 from below the bottom surface 208 of the base 202 of the bracket 200 until the second band end 304 extends through the third base aperture 220 of the base 202 of the bracket 200 with the second band opening 308 positioned above the top surface 206 of the base 202 of the bracket 200. The second base aperture 214 and the third base aperture 220 provide two options for surrounding objects of different sizes using the same band 300.

Although, the base 202 of the bracket 200 in the embodiment illustrated in FIG. 1 includes a third base aperture 220, in an alternative embodiment, the base 202 of the bracket 200 may only include the first base aperture 210 and second base aperture 214. In alternative embodiments, the base 202 of the bracket 200 may include any suitable number of base apertures. In still other alternative embodiments, the shank 406 of the fastener 400 may not be threaded and the fastener 400 may not include the washer 408.

The band 300 also includes a plurality of openings to facilitate adjusting a length of the band 300 to surround an object to be secured to another object. To decrease a length of the band 300, the second band end 304 may be moved through the second base aperture 214 until a desired length of the band 300 is achieved. The fastener 400 may be utilized to secure the second band end 304 to the first band end 302 by inserting the threaded end 404 of the fastener 400 through the wall opening 418, the first band opening 306, and one of the plurality of band openings located above the top surface 206 of the base 202. Alternatively, the length of the band 300 may be decreased by moving the first band end 302 through the first base aperture 210 until a desired length of the band 300 is achieved. Still alternatively, both the first band end 302 may be move through the first base aperture 210 and the second band end 304 may be move through the second base aperture 214 to decrease the length of the band 300 to a desired length to surround an object being secured to another object.

Figure 4:
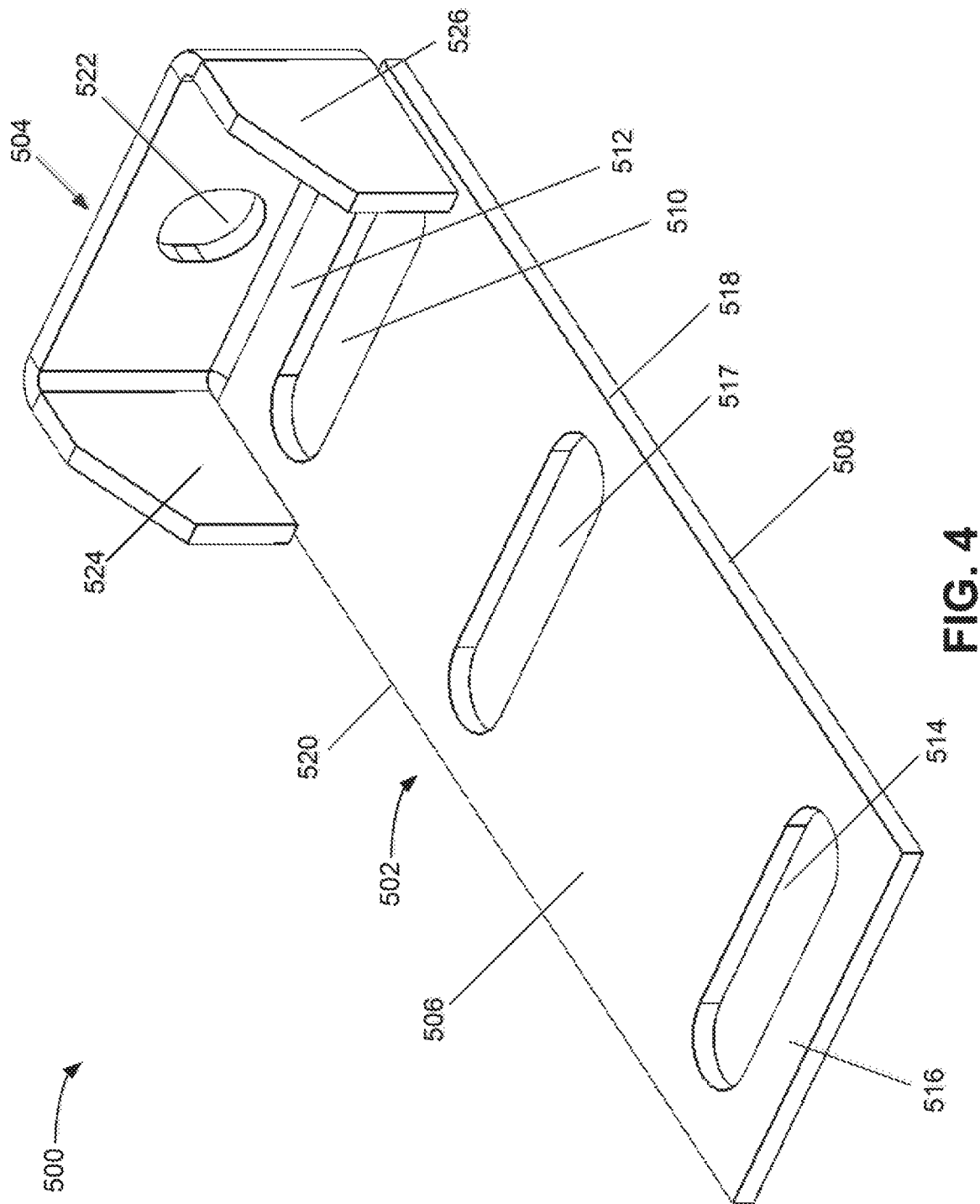
FIG. 4 is an isometric view of the bracket of FIG. 1 in accordance with another embodiment.

Referring to FIG. 4, an embodiment of a bracket 500 for use with the band 300 and fastener 400 to form the clamp 100 is shown. The bracket 500 includes a base 502 and a wall 504. The base 502 has a top surface 506 and an opposing bottom surface 508 for placement on a surface of an object (not shown). The base 502 of the bracket 500 is substantially planar to facilitate placement of the bottom surface 508 of the base 502 on an outer surface of the object (not shown) that is substantially flat, such as a duct. The base 502 also has a first base aperture 510 proximate a first base end 512 of the base 502, a second base aperture 514 proximate a second base end 516 that opposes the first base end 512, and a third base aperture 517 between the first base aperture 510 and the second base aperture 514. The base 502 also has a first base side 518 that extends between the first base end 512 and the second base end 516 and a second base side 520 that oppose the first base side 518. The second base side 520 also extends between the first base end 512 and the second base end 516.

The wall 504 of the bracket 200 is disposed at the first base end 512 and extends substantially perpendicular to and away from the top surface 506 of the base 502. The wall 504 may be integrally formed with the base 502 or may be attached to the base 502 by for example, welding. The wall 504 includes a wall opening 522 shaped and dimensioned to receive the threaded end 404 of the fastener 400. The wall 504 also includes a first sidewall 524 and a second sidewall 526 that opposes the first sidewall 524. The first sidewall 524 extends from the first base end 512 along a portion of the first base side 518. The second sidewall 526 extends from the first base end 512 along a portion the second base side 520. The first sidewall 524 and the second sidewall 526 are spaced apart such that the band 300 fits between the first sidewall 524 and the second sidewall 526.

The base 502 of the bracket 500 of the embodiment in FIG. 4 may be made from any suitable rigid material. In this embodiment, when the bracket 500 is used with the band 300 and fastener 400 to form the clamp 100 for surrounding an object (not shown) with a substantially flat outer surface, the base 502 of the bracket 500 to match the bottom surface 508 of the base 502 to the outer surface of the object (not shown) to facilitate placement of the bottom surface 508 of the base 502 of the bracket 500 on the outer surface of the object (not shown). Alternatively, the base 502 of the bracket 500 may be made of any suitable deformable material, such as, for example, metal or plastic. When the base 502 is used with the band 300 and fastener 400 to form the clamp 100 for surrounding an object (not shown) with a substantially curved outer surface, the base 505 may be deformed to match the bottom surface 508 of the base 502 to the outer surface of the object (not shown) to facilitate placement of the bottom surface 508 of the base 502 of the bracket 500 on the outer surface of the object (not shown).

Referring to FIG. 5, an exploded isometric view of another example embodiment of a clamp 600 for securing objects together is shown. In the example embodiment shown in FIG. 5, the clamp 600 includes the bracket 200 and the band 300. The clamp 600 also includes a fastener 700 that includes a head 702, a threaded end 704, a shank 706 extending between the head 702 and the threaded end 704. The fastener 700 also includes a washer 708 and a threaded nut 710. In this embodiment, the shank 706 is threaded. It will be appreciated that in alternative embodiments, the shank 706 may include a non-treaded body between the head 702 and the threaded end 704 of the fastener 700.

Figure 6A:
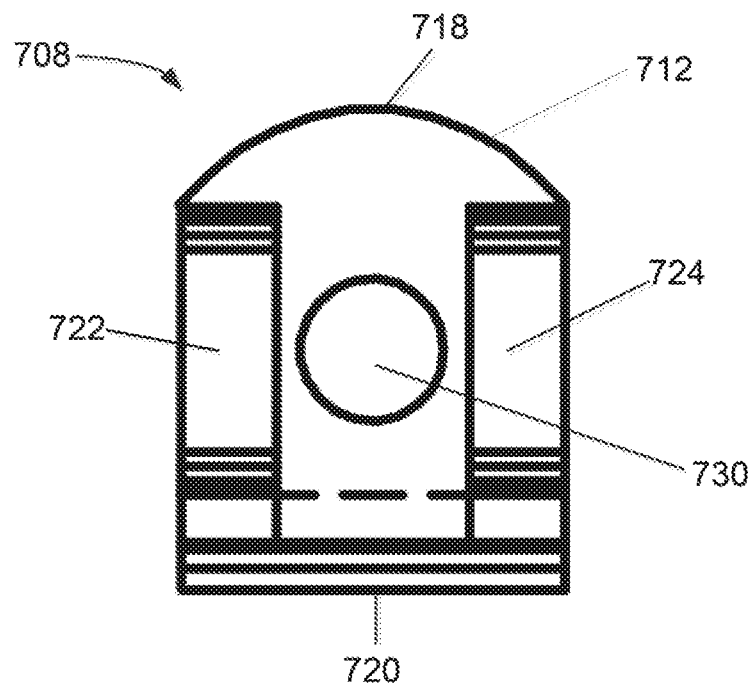
FIG. 6A is a plan view of a washer of the clamp of FIG. 5 in accordance with an embodiment.
Figure 6B:
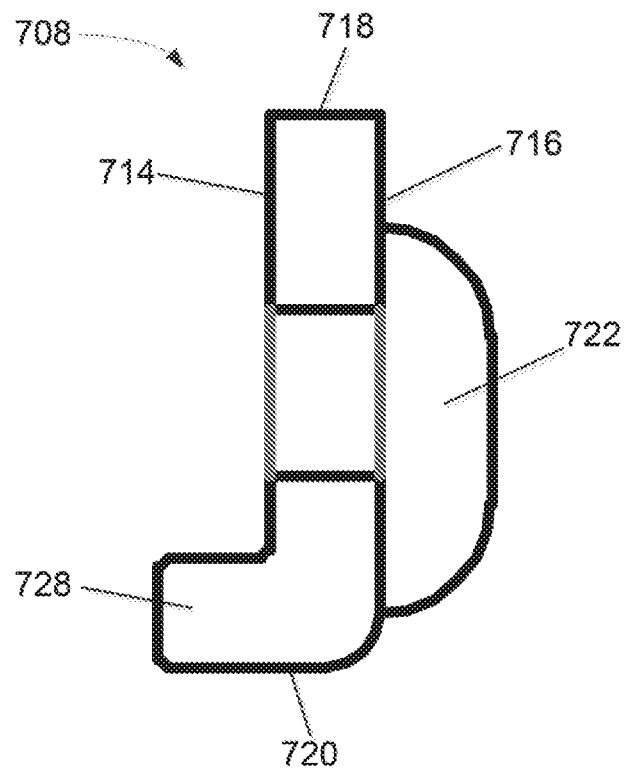

Referring to FIGS. 6A and 6B, a plan view and a cross-sectional view of the washer 708 are shown. The washer 708 includes a body 712 that has a front 714, a back 716, a top 718, a bottom 720, a first washer sidewall 722 and a second washer sidewall 724 opposing the first washer sidewall 722. The first washer sidewall 722 extends in a direction away from the back 716 of the body 712. Similarly the second washer sidewall 724 extends in a direction away from the back 716 of the body 721. The washer 708 also includes a bottom washer wall 728 that extends from the bottom 720 in a direction away from the front 714 of the body 712. The bottom washer wall 728 is configured to receive the threaded nut 710 as described in further detail below. The body 712 of the washer 708 includes a washer aperture 730 that extends from the front 714 to the back 716 of the body 712. The washer aperture 730 is shaped and dimensioned to receive the threaded end 704 and a portion of the threaded shank 706 of the fastener 700. The first washer sidewall 722 and second washer sidewalls 724 are spaced apart from each other such that the second band end 304 fits between the first washer sidewall 722 and the second washer sidewall 724 when the clamp 600 is assembled.

In the example embodiment illustrated in FIG. 5, the threaded nut 710 includes an integral washer 732 that faces the threaded end 704 of the fastener 700 when the clamp 600 is assembled. It will be appreciated that the integral washer 732 is optional and that in alternative embodiments the integral washer 732 may be omitted from the threaded nut 710.

The assembly of the clamp 600 of FIG. 5 will now be described with reference to FIG. 7. As illustrated in FIG. 7, the band 300 surrounds an object (not shown) with the first band end 302 extending through the first base aperture 210 of the base 202 of the bracket 200 such that the first band opening 306 is positioned above the top surface 206 of the base 202 of the bracket 200 and the second band end 304 extending through the second base aperture 214 of the base 202 of the bracket 200 such that the second band opening 308 is positioned above the top surface 206 of the base 202 of the bracket 200 and between the first washer sidewall 722 and second washer sidewall 724.

The fastener 700 is utilized to secure the second band end 304 to the first band end 302 and move the second band end 304 towards the first band end 302 to tighten the band 300 and the base 202 of the bracket 200 to the curved surface of the object (not shown) to secure the object to another object nested within the object. To secure the second band end 304 to the first band end 302, the threaded end 704 of the fastener 700 inserted through the wall opening 218, the first band opening 306, the washer aperture 730, and the second band opening 308 until the head 702 of the fastener 700 abuts the wall 204 of the bracket 200 so that the threaded shank 706 extends between the first band end 302 and the second band end 304. The threaded nut 710 is attached to the threaded end 704 of the fastener 700 and received within the bottom washer wall 728 to secure the second band end 304 to the first band end 302. The head 702 of the fastener 700 may be rotated (e.g. torqued) to apply a force against the wall 204 of the bracket 200 to move the second band end 304 towards the first band end 302 to tighten the band 300 and the base 202 of the bracket 200 to the surface of the object (not shown). The washer 708 acts as an anchor for the nut 710 so that the first washer sidewall 722 and the second washer sidewall 724 brace against the band 300 and the bottom washer wall 728 blocks the nut 710 to inhibit the nut 710 from rotating when the head 702 of the fastener 700 is torqued to move the second band end 304 towards the first band end 302 to tighten the band 300 and the base 202 of the bracket 200 to the surface of the object (not shown). Optionally, the fastener 700 may include a second washer (not shown) for placement between the head 402 of the fastener 400 and the wall 204 of the bracket 200.

The clamp described herein includes a bracket and a band whose length is adjustable to surround an object of any size and/or shape to facilitate securing the object to another object. The width of the assembled clamp described herein is also adjustable to surround an object of any size and/or shape to facilitate securing the object to another object.

The described embodiments are to be considered in all respects only as illustrative and not restrictive. The scope of the claims should not be limited by the preferred embodiments set forth in the examples, but should be given the broadest interpretation consistent with the description as a whole. All changes that come with meaning and range of equivalency of the claims are to be embraced within their scope.

What is claimed is:

1. A clamp comprising:
   a band configured to substantially surround an object between a first band end and a second band end, the first band end comprising a first band opening and the second band end comprising a second band opening;
   a bracket comprising:
      a base comprising a top surface, an opposing bottom surface for placement on a surface of the object, a first base aperture through the top surface and the bottom surface for receiving the first band end and a second base aperture through the top surface and the bottom surface, the second base aperture spaced from the first base aperture for receiving the second band end; and,
      a wall extending substantially perpendicular to the top surface of the base, the wall having a wall opening; and,
   a fastener configured to extend through the wall opening, the first band opening and the second band opening to secure the first band end to the second band end and move the second band end towards the first band end to tighten the band and the base of the bracket to the surface of the object.

2. The claim according to claim 1, wherein the fastener comprises a fastener head configured to abut the wall and apply a force against the wall to move the second band end towards the first band end to tighten the band and the base of the bracket to the surface of the object.

3. The clamp according to claim 2, wherein the fastener is further configured to move the second band end away from the first band end to loosen the band and the base of the bracket from the surface of the object.

4. The clamp of claim 2, wherein the fastener is rotatable within the wall opening, the first band opening and the second band opening to move the second band end towards the first band end to tighten the band and the base of the bracket to the surface of the object.

5. The clamp according to claim 3, wherein the fastener is further rotatable within the wall opening, the first band opening and the second band opening to move the second band end away from the first band end to the band and the base of the bracket to the surface of the object.

6. The clamp according to claim 1, wherein the base comprises a third base aperture disposed between the first base aperture and the second base aperture for receiving the second band end.

7. The clamp according to claim 6, wherein the fastener further comprises a threaded shank.

8. The clamp according to claim 1, wherein the fastener comprises a threaded shank to extend through the wall opening, a nut to securely engage with the threaded shank, and a washer to brace the band at the second band end and to block the nut from rotating when the threaded shank is rotated to tighten the band.

9. The clamp of claim 8, wherein the washer comprises a first sidewall and a second sidewall opposed to the first sidewall to brace the second band end therebetween.

10. The clamp of claim 8, wherein the washer comprises a bottom wall to receive the nut and to block the nut from rotating when the head of the fastener is rotated.

11. The clamp according to claim 1, wherein the base of the bracket is substantially flat.

12. The clamp according to claim 1, wherein the base of the bracket is made from a deformable material.

13. The clamp according to claim 1, wherein the base of the bracket is made from a metal.

14. The clamp of claim 1, wherein the base of the bracket has an arcuate shape.

15. The clamp of claim 1, wherein the band comprises a plurality of band openings between the first band end and the second band end, the plurality of band openings including the first band opening and the second band opening.

16. The clamp of claim 1, wherein the bracket and the wall are integrally formed.

17. A clamp comprising:
  a band configured to substantially surround an object between a first band end and a second band end, the first band end comprising a first band opening and the second band end comprising a second band opening;
  a bracket comprising:
    a base comprising a top surface, an opposing bottom surface for placement on a surface of the object, a first base aperture through the top surface and the bottom surface for receiving the first band end and a second base aperture through the top surface and the bottom surface, the second base aperture spaced from the first base aperture for receiving the second band end; and,
    a wall extending substantially perpendicular to the top surface of the base, the wall having a wall opening; and,
  a fastener configured to extend through the wall opening, the first band opening and the second band opening to secure the first band end to the second band end and move the second band end towards the first band end to tighten the band and the base of the bracket to the surface of the object, wherein the fastener comprises a threaded shank to extend through the wall opening, a nut to securely engage with the threaded shank, and a washer to brace the band at the second band end and to block the nut from rotating when the threaded shank is rotated to tighten the band.

\* \* \* \* \*